United States Patent
Mitra et al.

(10) Patent No.: US 7,339,937 B2
(45) Date of Patent: Mar. 4, 2008

(54) WIDE-AREA CONTENT-BASED ROUTING ARCHITECTURE

(75) Inventors: Arindam Mitra, Winnipeg (CA); Murhucumaru Maheswaran, Winnipeg (CA); Jose Alejandro Rueda, Winnipeg (CA)

(73) Assignee: Telecommunications Research Laboratory, Edmonton, Alberta (CA)

( * ) Notice: Subject to any disclaimer, the term of this patent is extended or adjusted under 35 U.S.C. 154(b) by 1159 days.

(21) Appl. No.: 10/295,036

(22) Filed: Nov. 15, 2002

(65) Prior Publication Data

US 2003/0099237 A1 May 29, 2003

Related U.S. Application Data

(60) Provisional application No. 60/331,459, filed on Nov. 16, 2001.

(51) Int. Cl.
*H04L 12/56* (2006.01)

(52) U.S. Cl. .................. 370/395.53; 370/395; 370/255

(58) Field of Classification Search ........... 370/395.53, 370/395.6, 397
See application file for complete search history.

(56) References Cited

U.S. PATENT DOCUMENTS

| | | | |
|---|---|---|---|
| 4,914,571 A | 4/1990 | Baratz et al. | |
| 5,251,205 A | 10/1993 | Callon et al. | |
| 5,511,208 A | 4/1996 | Boyles et al. | |
| 5,812,768 A | 9/1998 | Page et al. | |
| 5,968,121 A | 10/1999 | Logan et al. | |
| 6,006,264 A | 12/1999 | Colby et al. | |
| 6,052,718 A | 4/2000 | Gifford | |
| 6,058,423 A | 5/2000 | Factor | |
| 6,104,699 A * | 8/2000 | Holender et al. | ........... 370/235 |
| 6,216,173 B1 | 4/2001 | Jones et al. | |
| 6,256,675 B1 | 7/2001 | Rabinovich | |
| 6,304,639 B1 * | 10/2001 | Malomsoky et al. | .. 379/112.04 |
| 6,363,319 B1 | 3/2002 | Hsu | |
| 6,430,618 B1 | 8/2002 | Karger et al. | |
| 7,046,669 B1 * | 5/2006 | Mauger et al. | ............. 370/393 |
| 2002/0191584 A1 * | 12/2002 | Korus et al. | ................ 370/349 |

* cited by examiner

*Primary Examiner*—Chi Pham
*Assistant Examiner*—Phuc Tran
(74) *Attorney, Agent, or Firm*—Adrian D. Battison; Michael R. Williams; Ryan W. Dupuis

(57) ABSTRACT

Content networking provides a content-based routing architecture, in which a virtual overlay network called the "virtual content network" is superimposed over the physical network. The content network contains content routers as the nodes and "pathways" as links. The content-based routers at the edge of the content network may be either a gateway to the client domain or a gateway to the server domain whereas the interior ones correspond to the content switches dedicated for steering content requests and replies. The pathways are virtual paths along the physical network that connect the corresponding content routers. The tags for tagging content requests at the ingress points are designed to incorporate several different attributes of the content in the routing process. The path chosen for routing the request is the optimal path and is chosen from multiple paths leading to the replicas of the content.

14 Claims, 13 Drawing Sheets

Tag Dissemination process for Route Push Method.

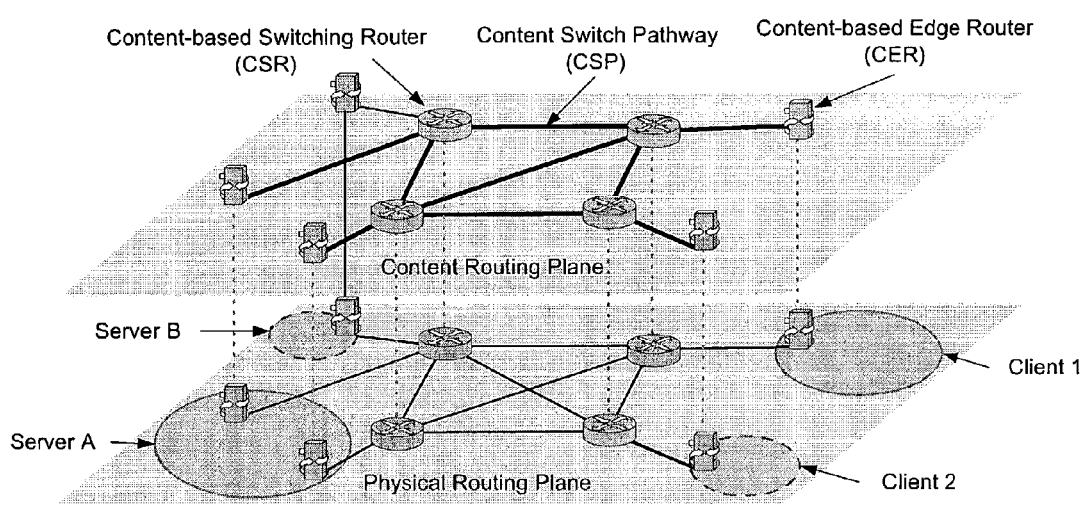
Figure 1: An example deployment of a virtual content network.

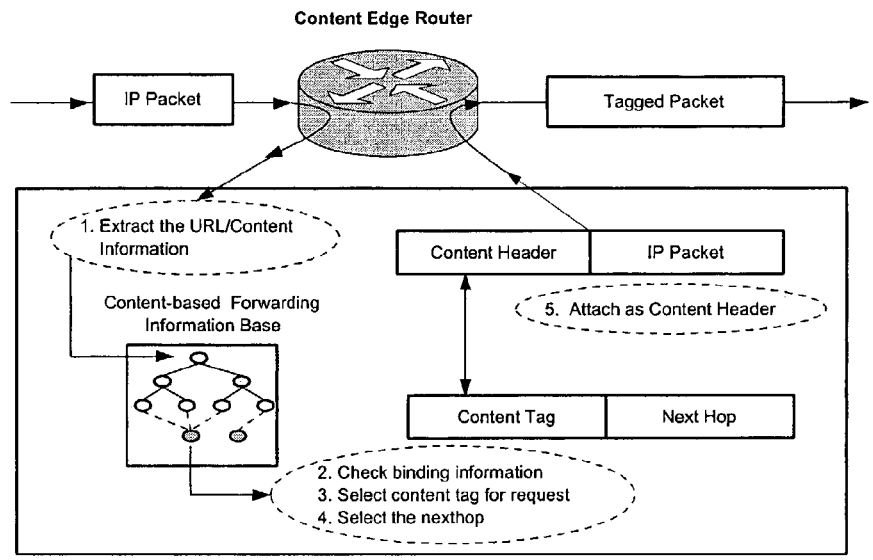
Figure 2 : The content tagging process in a CER.
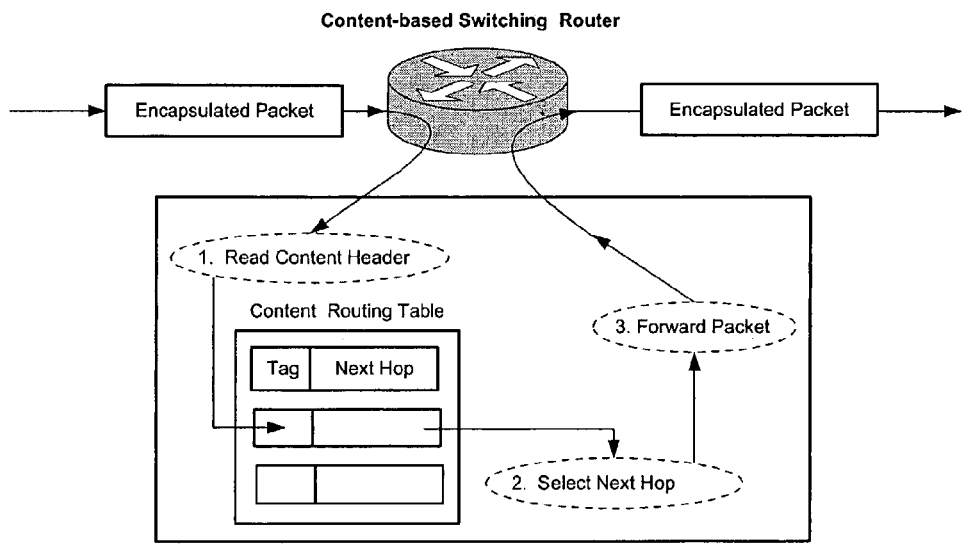
Figure 3 : The content-based routing process in a CSR.

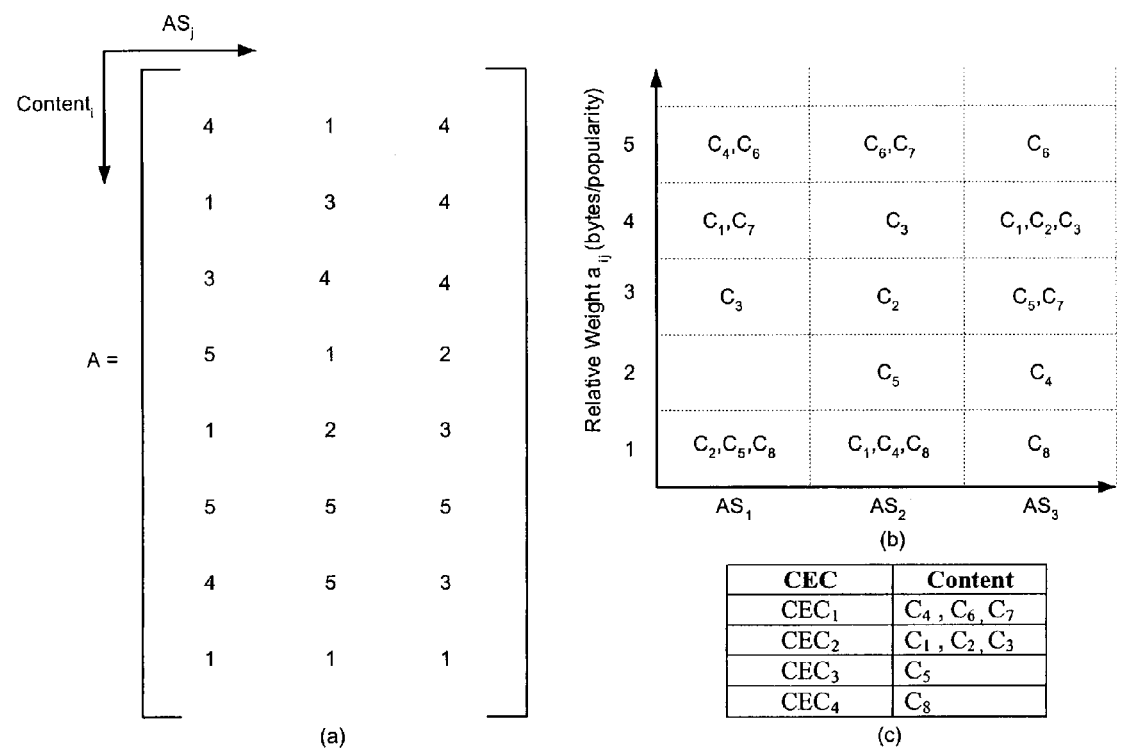
Figure 4 : Content classification process

```
GroupObj(numDoc m, numAS n):
/* Executed by a CER group for m documents introduced to VCN */
    create matrix A[m x (n+1)]
    for i= 0,m
        for j= 0,n
            A[i,j] = $\frac{S_{Content_i,t}/\bar{s}_t}{L(Content_i,AS_j) \times G(Ccontent_i)}$
        endfor
        A[i,j] = false
    endfor
    cntCEC = 0
    for i= 0,m
        if(A[i,n] == false)
            create new CEC set CEC$_{cntCEC}$ → { null } and initialize N=0
            add Content$_i$ to the set CEC$_{cntCEC}$
            A[i,n] = true
            for j= (i+1),m
                for k= 0,n
                    if(A[j,n] = false and A[j,k] = A[i,0] and ($l_b \leq \sum_{i=1}^{N} s_{Content_i} \leq h_b$))
                        if(Type(Content$_j$) = Type(Content$_i$))
                            add Content$_j$ to the set CEC$_{cntCEC}$ and increament N by 1
                            A[j,n] = true
                        endif
                    endif
                endfor
            endfor
            cntCEC = cntCEC+1
        endif
    endfor
```

Figure 5 : CEC creation algorithm.

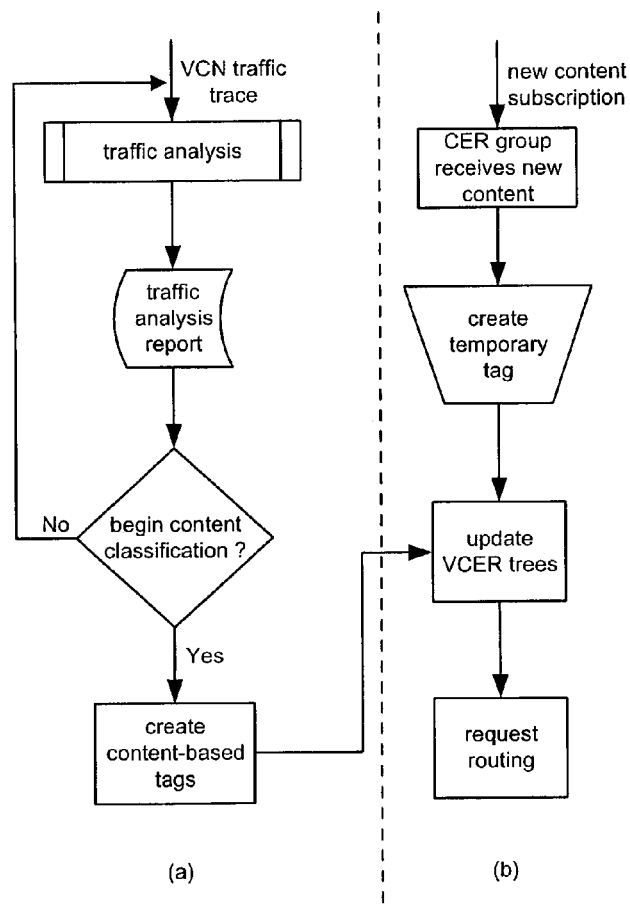
Figure 6 : (a) This phase is run at over periodic intervals to create the content-based tags. (b) This phase is executed when a new content is introduced to the VCN.

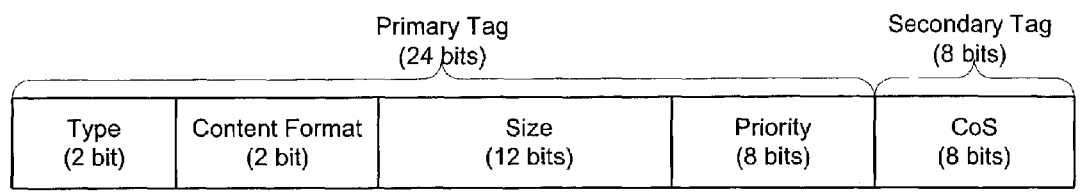
Figure 7 : 32-bit content-derived tag format.
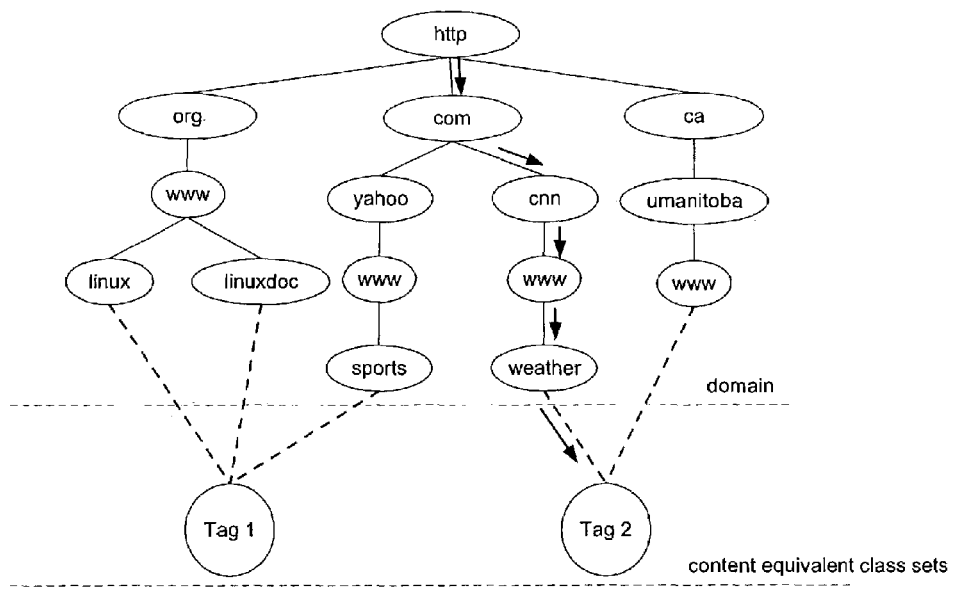
Figure 8 : Namespace tree showing the content-to-tag bindings.

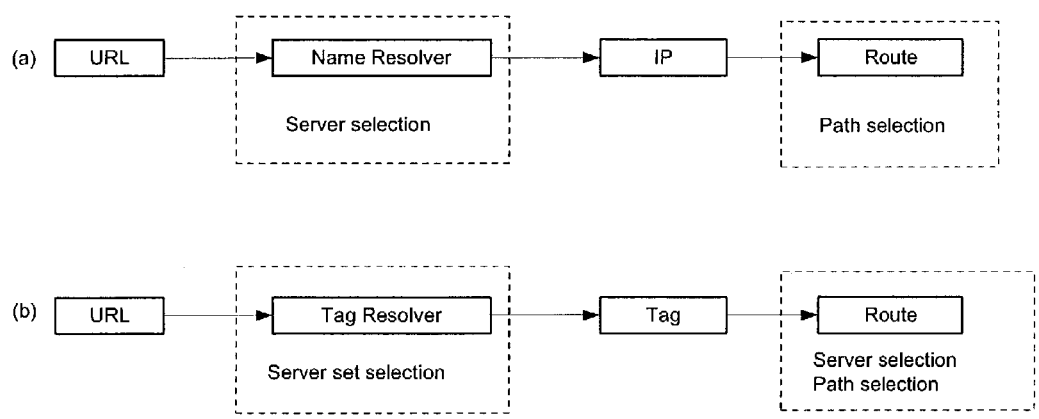
Figure 9 : (a) IP resolution scheme (b) Tag resolution scheme.

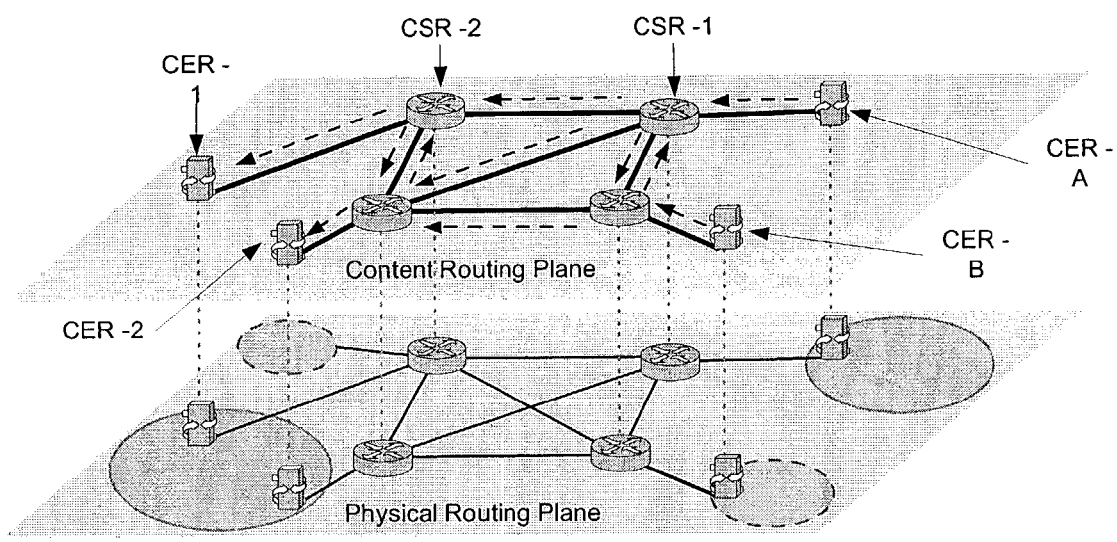
Figure 10 : Tag Dissemination process for Route Push Method.

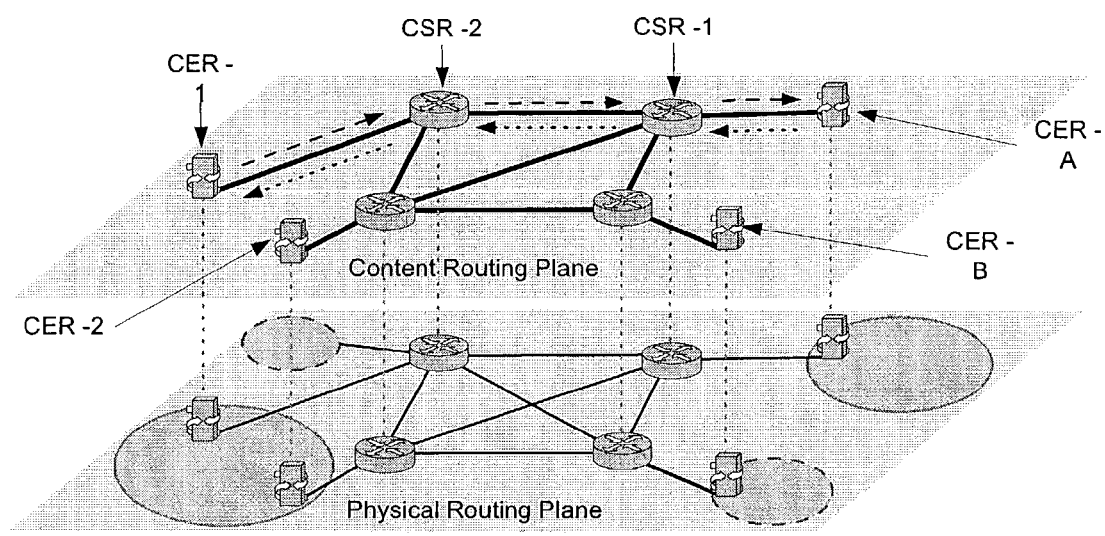
Figure 11 : An example of request steering and content delivery for RPM.

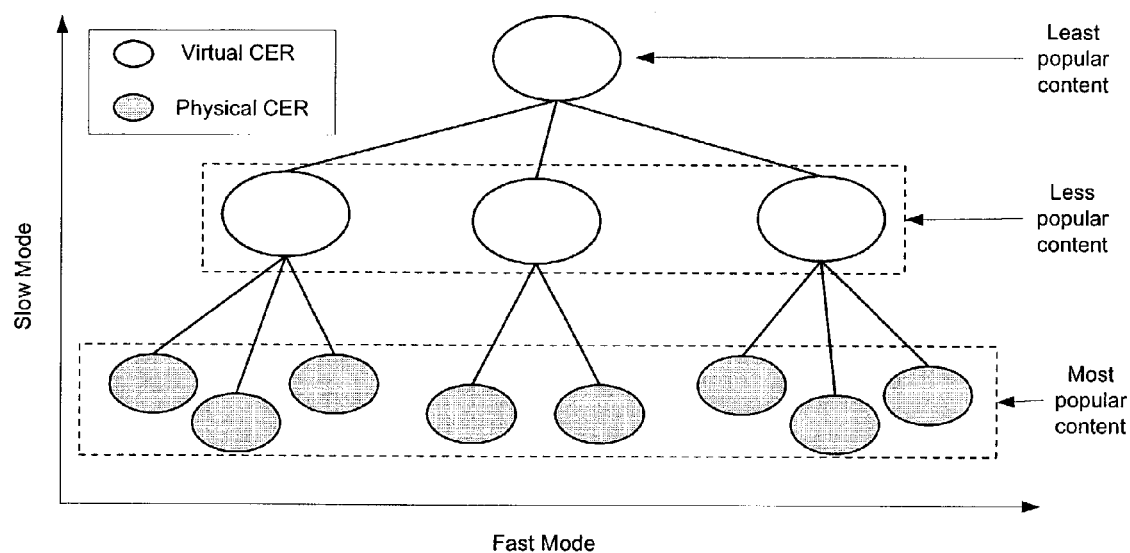
Figure 12 : An example virtual CER tree.

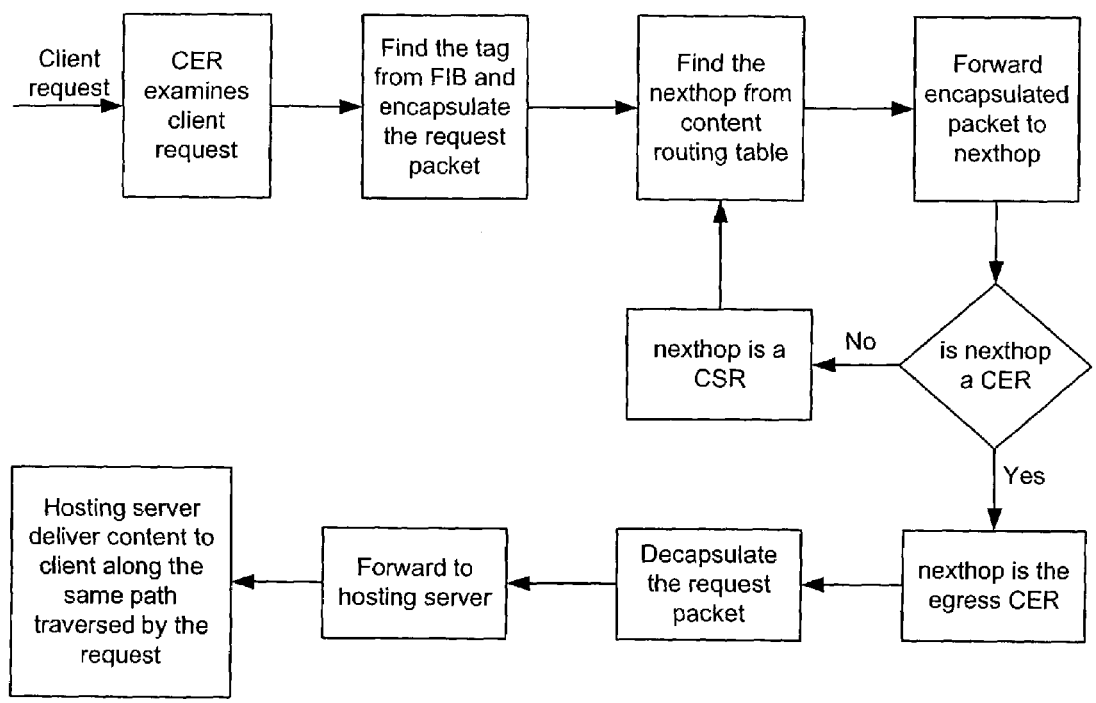
Figure 13 : Content-based forwarding process.

| Physical | Size, version, modification date, ownership, permissions, copyrights, author |
|---|---|
| Name-based | Filename, location name, URL, origin server name |
| End data type | HTML, cookies, scripts, audio/video clips text |
| Popularity | Temporal, spatial |

Figure 14 : Structural Attributes

| Access | Duration, streaming, non-streaming, variable-bit rate, constant-bit rate, adaptive-bit rate |
|---|---|
| Quality of Service | Bandwidth, delay, loss tolerance |
| Document Type | Static, dynamic |

Figure 15 : Semantical Attributes

| 00 | Streaming content |
|----|-------------------|
| 01 | Non-streaming content |
| 10 | Temporary |
| 11 | Reserved |

Figure 16 : Shows different type field values for different content types

| Type Field | CF field | Document Format |
|------------|----------|-----------------|
| 00 | 00 | Audio e.g., MPEG, Quicktime, Realplay etc. |
| | 01 | Audio Reserved |
| | 10 | Video e.g., MPEG, Quicktime, Realplay etc. |
| | 11 | Video Reserved |
| 01 | 00 | Image e.g., JPEG, BMP, TIFF, GIF etc. |
| | 01 | Text e.g., plain, richtext, hypertext, directory etc. |
| | 10 | Application data e.g., postscript, octet-stream, word, word perfect etc. |
| | 11 | Multipart e.g., mixed digest, form-data, encrypted |
| 10 | 00 | Streaming video |
| | 01 | Streaming audio |
| | 10 | Non-streaming video |
| | 11 | Non-streaming audio |
| 11 | Reserved | Reserved |

Figure 17 : A probable list for type and CF field combination.

WIDE-AREA CONTENT-BASED ROUTING ARCHITECTURE

This application claims priority under 35 U.S.C. 119 from Provisional Application Ser. No. 60/331,459 filed Nov. 16, 2001.

FIELD OF INVENTION

The hyper-growth of the Internet along with the emergence of several business-critical applications that heavily rely on the Internet have increased the load on its infrastructural services. Some of the crucial Internet services for applications include facilities to access content, support for efficiently transporting content and the ability to discover and access services. Caching and replication are two traditional strategies that may be employed to improve Internet services. These strategies can be implemented in two different ways: (a) on demand by the clients (content or service requesters) or (b) by the servers (content or service providers).

On-demand caching by clients is a well established technique that is commonly used in the Internet. Simplicity is one of the advantages of this technique. By reducing the net load imposed by an application on the Internet infrastructure, this technique attempts to improve the overall performance. In this scheme, the service providers do not have direct control over the caching decisions. As business critical applications are deployed over the Internet, it is becoming necessary for the service providers to ensure that the clients are receiving service at a satisfactory level to preserve brand equity and customer loyalty.

This issue has prompted a flurry of activities in the area of server-initiated caching and replication. One emerging technology in this area is content-aware networking. In content-aware networking, a new generation of routers specifically designed to address the unique requirements of Web traffic are used. These "content-based" routers have the ability to route TCP or UDP flows based on the URL and cookie in the payload. This ability allows the assignment of requests to one of various servers depending on the specific content requested. The previous generation of routers were able to route incoming packets based on the destination IP, protocol ID, and transport port number. Under this scenario the router cannot differentiate, for example, between a CGI script request or a streaming audio request, both of which use TCP port 80 but have very different quality of service (QoS) requirements. Content-based routers provide flexibility in defining policies for prioritizing traffic and for balancing load and content among servers so that Service Level Agreements can be met.

Content networking technologies can be deployed in several ways to improve a user's experience on the Internet. The first approach is the construction of virtual web servers, where a collection of servers or server clusters appear as one server. This approach can be generalized to arrive at the second approach where virtual web sites are constructed from one or more geographically dispersed data centers that appear as one domain name.

In the first approach [25], a content router is interposed between the client and server, i.e., a request should pass through the content router. The content router examines the payload contained in the request packet and chooses an appropriate destination. In this mode of deployment, the content router is used as a load balancer for the back-end servers and the content router should be all knowing to make optimal decisions. In the second approach [27], nameservers may be used to select the most appropriate "server site" depending on the geographical locations of the clients and servers and network and server loadings. The first approach has the disadvantage of lack of scalability and a single point of failure and the second approach is inefficient in handling portions of a site (i.e., the hosting site cannot be partitioned on granularity of the documents, the whole site needs to be accessed or replicated).

In essence, content routing involves both locating and accessing content. Locating content includes content discovery on the network. Accessing content typically requires identifying a network path with the desired quality of service parameters and setting up sufficient resources along the path. The Intentional Naming System (INS) [26] presents a resource discovery and routing system based on the description of the services. This method is less scalable than the hierarchical name-space provided by the URLs and also the variable length of names would lead to expensive route resolution at each name-based router. The Name Based Routing Protocol (NBRP) [16] use a two-phase approach, similar to the current data access paradigm in the Internet, where variable length content names are resolved to addresses before the actual content is being exchanged.

The Content Addressable Network (CAN) [24] presents a highly distributed hash table architecture that can be implemented on the Internet. The main idea is to create a virtual coordinate space of multiple dimensions and hash a key on to this space. This is highly scalable routing architecture, however, content placement in the coordinate space becomes location dependent. In a similar approach, the Pastry system [2] is an overlay network of nodes where each node is assigned a randomly generated 128-bit identifier to denote the node's position in a circular nodeid space. Given a message with a key, a Pastry node routes the message to a node whose identification number, called nodeid, is numerically closest to the key. The routing metric involved is the number of IP routing hops. Pastry is decentralized system and is a highly scalable routing mechanism. The Service Level Routing [17] framework provides a general architecture for accessing and discovering services and content on the Internet. The service level routing is performed by service level routers (SLRs) posing as ingress and egress routers between clients and the servers and is very efficient in mapping individual flows onto virtual networks. The content routing protocol presented [6] uses a Content Routing Protocol (CRP) based on the URL decomposition of data objects. It constructs and maintains a namespace tree by identifying the protocol, network location, and individual paths for the contents. This method is highly suitable for compressing large number of content names into smaller inverted URL tree form.

Currently, the most popular and widely deployed technique on the Internet is the Domain Name System (DNS) [11, 9]. It uses a distributed database maintained and stored across a hierarchy of nameservers. The nameservers in DNS are used to map mnemonic names to network locations. A DNS-based routing technique is a routing scheme that uses DNS name resolution service to map a request on to a network location and then routes the request to that location. The DNS uses a manually delegated name space that is partitioned in domains and subdomains. Each domain is administered by an authoritative nameserver. The clients and the hosting servers will query their own local nameserver for name resolution. Name servers will either reply to a query or refer the query to an higher level nameserver. Currently, a number of content distribution overlay networks use the DNS for redirecting user requests and perform load balancing among the content hosting servers. A recent study [5] identifies two types of Content Distribution Networks (CDNs), using the DNS redirection techniques. The final results of the study, however, reveals that in average case situations, response times do not improve by using the DNS lookups for a new server. Yet another study [13], reveals that the CDNs using DNS do not select the best server in a consistent manner. A recent study [3] shows that a server chosen through DNS-based name resolution is not necessarily the optimal server. More clearly, a server selected by this technique is not always close to a client. As a result, the hosting server chosen to be close to the client's local nameserver is not necessarily the closest to the client. This study also suggests that to improve the performance of the DNS protocol, it is necessary to carry additional information to identify the requesting client.

The following references disclose subject matter which are relevant to the present invention, the disclosure of which is incorporated herein by reference.

PUBLICATIONS

[1] A. Anastasiadi and S. Kapidakis. A Computational Economy for Dynamic Load Balancing and Data Replication. In *1st International Conference on Information and Computation Economies*, pages 166-180, October 1998.

[2] A. Rowstron and P. Druschel. Pastry: Scalable, distributed object location and routing for large-scale peer-to-peer systems. In *18th IFIP/ACM International Conference on Distributed Systems Platform (Middleware '01)*, pages 329-350, November 2001.

[3] A. Shaikh, R. Tewari, and M. Agrawa. On the Effectiveness of DNS-based Server Selection. In *IEEE INFOCOM*, volume 3, pages 1801-1810, April 2001.

[4] B. Davie and Y. Rekhter. *MPLS: Technology and Applications*. Morgan Kaufmann Publishers, San Diego, Calif., 2000.

[5] B. Krishnamurthy, C. Wills, and Y. Zhang. On the Use and Performance of Content Distribution Networks. In *Proceedings of ACM SIGCOMM Internet Measurement Workshop*, August 2001.

[6] B. S. Michel, K. Nikoloudakis, P. Reiher, and L. Zhang. URL Forwarding and Compression in Adaptive Web Caching. In *IEEE INFOCOM*, volume 2, pages 670-678, March 2000.

[7] D. Black. Differentiated Services and Tunnels, October 2000.

[8] D. Farinacci, T. Li, S. Hanks, D. Meyer, and P. Traina. Generic Routing Encapsulation (GRE), March 2000.

[9] G. Kessler and S. Shepard. A Primer On Internet and TCP/IP Tools and Utilities, March 1997.

[10] G. Malkin. RIP Version 2 Protocol Analysis, November 1994.

[11] J. Postel. Domain Name System Structure and Delegation, March 1994.

[12] J. Moy. OSPF Version 2, April 1998.

[13] K. L. Johnson, J. F. Carr, M. S. Day, and M. F. Kaashoek. The Measured Performance of Content Distribution Networks. In *Computer Communications*, volume 24(2), pages 202-206, May 2001.

[14] K. Nichols, S. Blake, F. Baker, and D. Black. Definition of the Differentiated Services Field (DS Field) in the IPv4 and IPv6 Headers, December 1998.

[15] M. Day, B. Cain, G. Tomlinson, and P. Rzewski. A Model for Content Internetworking (CDI), November 2001.

[16] M. Gritter and D. R. Cheriton. An Architecture for Content Routing Support in the Internet. In *USENIX Symposium on Internet Technologies and Systems*, March 2001.

[17] N. Anerousis and G. Hjalmtysson. Service Level Routing on the Internet. In *IEEE Globecom*, volume 1b, pages 553-559, December 1999.

[18] N. Freed and N. Borenstein. Multipurpose Internet Mail Extensions (MIME) Part Two: Media Types, November 1996.

[19] P. Mockapetris. Domain Names—Concepts and Facilities, November 1987.

[20] S. Blake, D. Black, M. Carlson, E. Davies, Z. Wang, and W. Weiss. An Architecture for Differentiated Services, December 1998.

[21] S. Brown. *Implementing Virtual Private Networks*. McGraw Hill, Berkeley, Calif., 1999.

[22] S. Herzog. RSVP Extensions for Policy Control, January 2000.

[23] S. Kent and R. Atkinson. Security Architecture for the Internet Protocol, November 1998.

[24] S. Ratnasamy, P. Francis, M. Handley, and R. Karp. A Scalable Content-Addressable Network. In *ACM Conference on Applications, Technologies, Architectures and Protocols for Computer Communications*, pages 161-172, August 2001.

[25] V. Pai, M. Aron, G. Banga, M. Svendsen, P. Druschel, W. Zwaenepoel, and E. Nahum. Locality-Aware Request Distribution in Cluster-based Network Servers. In *8th ACM Conference on Architectural Support for Programming Languages and Operating Systems*, pages 205-216, October 1998.

[26] W. Adjie-Winoto, E. Schwartz, H. Balakrishnan, and J. Lilley. The Design and Implementation of an Intentional Naming System. In *17th ACM Symposium on Operating Systems Principles (SOSP '99)*, pages 186-201, December 1999.

[27] W. Tang, F. Du, M. W. Mutka, L. M. Ni, and A. Esfahanian. Supporting Global Replicated Services by a Routing-Metric-Aware DNS. In *2nd International Workshop on Advanced Issues of E-Commerce and Web Based Information Systems*, pages 67-74, June 2000.

The following U.S. patent references have been identified in a search in this field.

| U.S. Pat. No. | Date Pub. | Patent Name |
|---|---|---|
| 6363319 | 26 Mar. 2002 | Constraint-based route selection using biased cost |
| 6430618 | 06 Aug. 2002 | Method and apparatus for distributing requests among plurality of resources |
| 6216173 | 10 Apr. 2001 | Method and apparatus for content processing and routing |
| 6256675 | 03 Jul. 2001 | System and method for allocating requests for objects and managing replicas of objects in a network |
| 6052718 | 18 Apr. 2000 | Replica routing |
| 6058423 | 02 May 2000 | System and method for locating resources in a distributed network |
| 5968121 | 19 Oct. 1999 | Method and apparatus for representing and applying network topological data |
| 6006264 | 19 Dec. 1999 | Method and system for directing a flow between client and a server |
| 5812768 | 22 Sep. 1998 | Method and apparatus for redirecting a user for a new location on the world wide web using relative universal resource locators |
| 5511208 | 23 Apr. 1996 | Locating resources in computer networks having cache servers nodes |

-continued

| U.S. Pat. No. | Date Pub. | Patent Name |
|---|---|---|
| 5251205 | 05 Oct. 1993 | Multiple protocol routing |
| 4914571 | 03 Apr. 1990 | Locating resources in a computer network |

BRIEF DESCRIPTION OF DRAWINGS

FIG. 1 shows the virtual content network. The physical network consists of two client and two server sites. The client sites are connected to the server sites through the VCN.

FIG. 2 shows the tagging process in a CER. The client requests received are parsed and tagged at the CER. The tag contains information regarding the content and the also the application requirements. An probable tag format is shown in FIG. 7.

FIG. 3 shows the routing process in a CSR. The tag used to encapsulate network packets is used to route the packets.

FIG. 4 shows the matrix created to classify contents based on their popularity within the VCN. The content equivalence classes are created based on this classification.

FIG. 5 shows the algorithm which is used to create the content equivalence classes.

FIG. 6 shows the sequence in which temporary and the content-based tags are created and managed.

FIG. 7 shows a probable format for the content-header which is used to encapsulate network packets.

FIG. 8 shows the namespace tree that is used to store the content names and the corresponding tags.

FIG. 9 shows the different approaches used for routing by the traditional routing techniques and by the invention.

FIG. 10 shows an example for distributing tag information within the VCN.

FIG. 11 shows an example for steering requests or routing requests from ingress to egress CERs.

FIG. 12 shows the method used by VCN to store the namespace tree by creating groups of CERs. Each CER group will hold the entire namespace tree in distributive fashion.

FIG. 13 shows the entire process for routing in the VCN.

FIG. 14 shows a probable list of structural attributes that are used to characterize content.

FIG. 15 shows a probable list of semantical attributes that are used to characterize content.

FIG. 16 shows the different types of content and their field codes.

FIG. 17 shows a probable list of different end-data types which currently in use.

SUMMARY OF INVENTION

Routing is a process of providing a path for client requests to the host which can serve the request. The source and the destination addresses contained inside the network packet holding the request are used to route the packet towards a server host.

The requested host may be overloaded with a very large number of requests or reside in a network which is congested due to very high traffic. In such a case, the client may have to wait for a long time. To avoid such situations and serve the clients better, the content providers replicate their contents across the Internet. To redirect the client requests to these replicated hosting sites, connection providers came up with a number of routing procedures for directing client requests to servers which can serve the request in the best possible manner at that instant.

However, with the exponential growth of Internet and the corresponding increase in the number of users, the existing routing architectures were not always capable of handling the high volumes of client requests suitably. It was conjectured that in order to maintain the quality of service for very high volumes of client requests it is necessary to identify the network condition and the properties of the content requested and use this information in addition to the source-destination addresses to redirect the requests to the best performing server hosts.

Content routing is a process which routes requests based on the properties of the content requested and the network condition. In the current deployments, content routers parse network packets to identify the properties of the contents held in the packets and use the information to find the best path to a server. However, these processes suffer overhead from repeated parsing of the packets at each router. To solve this problem, naming systems were developed that use name resolvers to map a request to a location serving the requested content. But such content routing schemes often lead to high volumes of content descriptions, used for name resolution, that are difficult to manage or lack the complexity to maintain the consistency of network performance. This made it necessary to fine-tune the content routing procedures that can avoid such problems.

This invention presents a content routing architecture that solves the above problems. The invention employs a content characterization scheme that makes it possible to identify and partition large volumes of dissimilar content. The content characterization scheme makes it possible to determine the properties of content available on the Internet, their resource requirements and their behaviour in accordance to the applications requesting the content. Content aggregations created by this scheme are much easier to manage than the current content routing models.

The invention creates virtual overlay networks called Virtual Content Network (VCN) that utilize content characterization schemes to map the client requests to the corresponding best performing content hosting site. The overlay network will have Content Edge Routers (CERs) that act as gateways to the content providing servers and also to the clients. The content hosting sites will advertise their data to the CERs who create the content tags that are used as redirections for the client requests. The content tags are distributed among the Content-based Switching Routers (CSR) which form the core of the VCN. The CERs and CSRs are connected by the Content-based Switching Paths (CSPs) which constitutes a network with maximum connectivity between nodes and low transmission costs. The CERs and CSRs will maintain a content routing hash table which holds the tag, the list of possible next hops and the performance metrics used for routing.

In order to avoid overloading the content routers with all the content tags formed by the VCN, the tags are stored in a distributed fashion through out the VCN. When a CER receives a client request, it will resolve the request to form a tag for the request. A wrapper will be created to encapsulate the content tag and the original request. The tag will be matched against the content routing table and the encapsulation is forwarded to the best next hop which will match the tag to the next best hop in its content routing table. This way the request will travel through the VCN to the egress CER that is closest to the best performing server promoting the request and along the path that is considered optimal at that instant. The egress CER will remove the wrapper and forward the request to the serving host. The result from the server is returned to the client using same path as the request. The optimality of the path will depend on the metrics specified by the application requesting the content at the ingress point.

The overlay network represents a fast path or a bypass network comprising of content-aware routing elements connected by quality of service (QoS) aware logical paths. The overlay network uses a simple hash table matching procedure, within the core of the network, to route a request to the most healthy server host. At lower layers, the overlay network uses MPLS as a carrier mechanism to implement the content routing method.

DETAILED DESCRIPTION OF INVENTION

This invention introduces a Protocol Independent Content Switching (PICS) architecture that is suitable for content aware networking in very-large scale geographically distributed networks. In the PICS architecture, several client and server sites are interconnected through a Virtual Content Network (VCN). The client sites contain the eventual consumers of the content that is managed by the VCN. The VCNs themselves can be networked to build larger networks. The client and server sites connect to the VCN using gateways that are content routers. Because the content is first examined by these routers, and they are at the edge of the VCN, we refer to these routers as the content edge routers (CERs). In our architecture, a client or server site can connect via multiple CERs to the VCN. Allowing multiple CERs per site precludes a single point of failure and provides an opportunity for enhanced load balancing among the content hosting servers. The CERs encapsulate the packets using a content header. The content header contains a content-based tag that is used to uniquely identify a content within the VCN. The VCN core has content-based switching routers (CSRs) to steer the content requests from the ingress (i.e., client side) CER to the egress (i.e., server side) CER based on the tags in the content header. The CSRs are simple switches that support a single forwarding component (i.e., algorithm for tag-based forwarding). The CER, on the other hand, are also responsible for characterization and classification of content.

An example deployment of PICS is illustrated in FIG. 1. It shows two client sites Client-1 and Client-2 connecting to the server sites Server-A and Server-B through a VCN. Server-A is connected to the VCN through two CERs whereas Server-B is connected through a single CER. Each of the client sites, Client-1 and Client-2 are also connected to the VCN through a single CER. The VCN consists of several CSRs that are connected by sequences of content switched paths (CSPs) or "pathways." The CSPs interconnect the CSRs and also connect the CERs to the CSRs.

The CSPs are virtual paths that are created when the VCN is initialized. As client and server sites enter and depart the VCN, the corresponding CSPs may be created and removed, respectively. The CSPs are used to "forward route" the content requests to the appropriate server site and to "reverse route" the content back to the "requesting" client site.

Server Sites

The server sites hold the content that is requested by the clients. The simplest server site can be a CER and an attached server that serves the corresponding content. In the general case, multiple CERs can act as front-ends to the servers that are in the site. The servers can be either origin servers or surrogate servers. An origin server holds the original copy of the content, i.e., if there are no replication of content this server will have the only copy. A surrogate server is a server that "rents" its resources so that content from origin servers can be replicated on it. The owner of the origin server that is referred to as the content provider is responsible for "paying" the rent for the surrogate server. By using a computational economy [1] based scheme for replicating content among the origin and surrogate servers it is possible to increase the server side resources for content that are popular and reduce the dedicated resources as the popularity decreases.

Therefore, in the PICS architecture, the requested content can be delivered either by an origin server or a surrogate server. The VCN does not differentiate between surrogate and origin servers. The server selection algorithm is built into the forward routing process.

Client Sites

The client sites have the clients that are requesting content. Typically a client site may have a single CER connecting it with the VCN. However, in some situations it may be useful to have multiple CERs. Some advantages of such configurations include lack of single point of failure and opportunity for traffic shaping within the VCN. Depending on the local routing policies, the CERs can be allocated traffic according to the quality of service (QoS) considerations.

Virtual Content Network

The VCN is a graph with the CERs and CSRs as the nodes and the CSPs as the edges. The VCN provides a Content Delivery Network [15] for the server sites to efficiently distribute their content. The VCNs may be deployed using a "peer model" similar to that used in Virtual Private Networks [21]. This model assumes the existence of VCN service providers who host the service. The client and server sites that need "speedy" content delivery would subscribe to the VCN by having content routing enabled gateways (i.e., CERs as gateways) and by connecting such gateways to the VCN core. The different VCN service providers could be connected among themselves to provide a larger virtual network.

Content Edge Router (CER)

As mentioned above, the CERs are at the "edges" of the VCN and the client and server sites. When a request for content is generated from a client site, it reaches the client side CER. The CER parses the packet carrying the request and if the content is handled by the VCN, then it identifies the content and tag it. The tag is generated by a combination of the content derived and the policy-based information. FIG. 2 illustrates the overall tagging process in the CERs. The process is discussed in detail in later part of this chapter.

A CER can be connected by multiple CSPs to the core of the VCN. Therefore, for the content that is handled by the VCN, the CERs should make initial routing decisions as to which core CSR should handle the request next. Each CER has a content-based routing table that is used by the CER for determining the routes. The information can be disseminated across the VCN by either flooding the routing information towards all CERs and maintaining a consistent route image throughout the entire VCN or operate on an on-demand basis. The on-demand approach provides the high activity CERs with more up-to-date route information.

Content-Based Switching Router (CSR)

The CSRs form the core of the VCN. Similar to the CERs, the CSRs also maintain content-based routing tables. However, the information contained in the CSR routing tables are different than the information found in the CER routing tables. The CER routing tables also contain the content value (e.g., the URL or cookie value) in addition to the tags generated from the content. The content value is necessary for the CER to perform the content-to-tag mapping. The CSRs use the content-based routing tables to steer the requests towards the appropriate server side CER. FIG. 3 shows the routing process in the CSRs.

Content-based Switched Path (CSP)

The CSPs interconnect the CERs and CSRs to form the VCN. A CSP is similar to a label switched path (LSP) in the Multi-Protocol Label Switching (MPLS) [4]. CSPs can be implemented using frame relay circuits, ATM circuits, IP-in-IP tunnels, generic routing encapsulation (GRE) tunnels [8], or IPSec [23] tunnels.

IP-in-IP and GRE tunnels can be subject to data spoofing. Some malicious router that is not an end-point of the tunnel could inject packets into the tunnel. Additional packet filters may be used to solve this problem resulting in increased overhead and complexity. Using IPSec tunnels is another way to solve this problem. However, the "key" management used by IPSec to authenticate packets adds cost to the data transmission.

To provide QoS, all tunneling mechanisms rely on services such as IP differentiated services (Diff-Serv) [20, 7]. When leased lines, frame relay circuits, or ATM circuits are used, stricter guarantees can be given for QoS than those possible with tunnel-based CSPs. One of the advantages of tunnel-based CSPs is that they can be used more widely. If stricter QoS guarantees are essential for the data traffic, then the routing algorithms may constrain such traffic to the appropriate portions of the network.

Content Characterization and Classification for Content-Based Routing

Content Characterization

Content characterization is a process that identifies the key attributes of content which can be used to generate an accurate description of the content and its resource requirements from the perspective of content-based routing and delivery mechanism. The primary motivation is to use this description to discover and access content. This invention identifies a possible list of content attributes that can be used to profile a content from the perspective of content-based routing. Some of the attributes identified are used to describe a content classification and a tagging strategy that is used in the content-based routing scheme.

To distinguish a content uniquely, it is necessary to understand the structure and semantics of data. The structural attributes and their values are directly dependent on the content while the semantic attributes relate to the behaviour of the application that accesses the content, i.e., the intended usage of the data by the requesting application. For example, an application may use the FTP protocol to download a large video clip for off-line viewing. Another application may access the same video clip for online viewing through a "media player" that requires real-time data transfer capabilities with QoS attributes. The routing schemes should be able to deduce this difference in service.

The invention intends to create a content profile a priori to the routing process. Such a profile is used to locate the content and also allows the routing protocol to infer those characteristics that directly affects the content delivery mechanism (e.g., bandwidth required for delivery). In a delivery network, such a profile should also surmise a content provider's relative status with respect to the other providers using the CDN services. Again, a content routing process, in effect, is triggered by an application agent requesting the content. At the time of request initiation, the agent specificies some rules for content access, like the QoS parameters like Diff-Serv. The routing system interfaced with the agent should ensure the requested QoS while delivering the content. To ensure that all these requirements of the content are met, in the characterization scheme, the content attributes are grouped in two distinct classes. The first class of attribute values are known prior to the routing process and can be used to create a content description, a priori, which is then used to discover the content on a network. The second class of attributes are initialized only at the time a request for the content is submitted and is used for accessing the content. A combination of these attibutes will decide the network resources that should be allocated for a request. More specifically, these classes can be defined as follows:

Structural Attributes: These are the properties of the content that impact the amount of computation and/or communication resources needed for handling the content and they are invariant of the requesting application or the user.

Semantical Attributes: These are the properties of the content that impact the amount of computation and/or communication resources needed for handling the content and they are dependent on the requesting application or the user. Their values depend on various conditions that are imposed at the time the content is being requested.

FIG. 14 shows a representative set of the structural attributes that are relevant for describing content. Structural attributes are further classified into four categories, where each category is used to define a definite set of structural properties for the content. In our content-based routing, some values from each category are used to describe the content. The physical attributes describe the properties of the content that are shared between the file system and the network. The name-based attributes are used to label the content for identification and location purposes. The names may be chosen in various ways. Some names may have components of the location embedded in them, e.g., URLs. While other names such as filenames may be arbitrarily chosen. The end data type attributes refer to the content formats. Although these formats are relevant to the end applications, these formats are independent of the applications and may have impact on the way the content could be handled by the network. The popularity attributes gives the spatial and temporal "interest" for the given content among the user population. The demand imposed by the content on the network may be indirectly depend on the popularity attributes. The spatial popularity refers to the current demand for the content in a specific portion of the VCN. The temporal popularity refers to the global demand across the VCN for the content over a specific time period.

FIG. 15 shows a representative set of semantic attributes. The semantic attributes can be further classified into four different categories with each category describing a definite class of resource requirements for the content and the application requesting the content. The access attributes define the requirements of the applications that access the content. These attributes may determine some of the service measures associated with or required by the content. For example, whether a content is of streaming type and its bit-rate characteristics may determine its bandwidth requirements. The quality of service (QoS) attributes defines the amount of network resources needed to support the application's access of the content. While the access attributes define an application's "intentions" from the application perspective, the QoS attributes define the same intentions from the network perspective. The end data type attributes are used to differentiate static and dynamic contents. Dynamic content is assembled on-demand based on inputs from the user or the accessing application.

The main idea to group the contents using their variable and non-variable properties is due to the intention to create aggregates (or groups) of contents with identifiable properties. A combination of some of the variable and non-variable attributes is used to create the aggregations and enable our content-based routing system to learn about the contents and their resource requirements. This a learning process for the routing model. Some of the variable content attributes are used to relate the contents to the forwarding algorithm built into our content-based routing scheme to implement suitable traffic shaping policies. Using such a scheme, the routing process in the content aware network is partially accomplished by setting up virtual path segments during the learning process. The remaining portion of the routing process may be done by switching the content requests and replies across the virtual path segments using some "content-based tag" that is generated from the content-aggregate attribute values.

Content Classification

Content classification is a process of grouping documents into classes such that the expected resource requirements for handling the documents within a class are similar. These classes are referred as Content Equivalence Classes (CECs). The resource requirements for handling documents include the resources used for storage and processing purposes and resources used for transporting purposes. The storage and processing resources are determined by the structural attributes of the content while the resources for transporting the content are determined by the semantic attributes of the content. The structural and semantic attributes are discussed in Section. A CEC will inherit the attribute values from its constituent documents. A CEC is identified by a tag that is derived from the attribute values of the CEC. This tag is used for discovering and accessing each individual document that constitutes the CEC.

The motivation to use content groups and content-derived tags is to compress the namespace that is used by the routing system for locating and accessing content. In traditional routing schemes, the routing is performed based on addresses with a pre-defined format and length, i.e., the size of the address space is fixed. These routing schemes are, however, completely location dependent. The main idea behind content-based routing is to liberate content access and discovery from the "original" location that holds or owns the content. In general, to achieve this the content-routing schemes base their routing on a set of attributes that describe the content. Mostly, some form of content-name that is not dependent on the actual location is used for content-routing (e.g., URL of the content). One of the major challenges with a routing scheme based on content-naming is that the namespace can be very large. However, in practice, the number of distinct content names that are handled by a content-based routing system is a very small fraction of the total namespace. In our content-based routing scheme, we use the attribute values of the CECs to generate fixed-length tags. By grouping multiple contents in a single CEC, we actually bind the specifications of multiple contents in one description (i.e., one name can be used to identify multiple contents). Since each CEC has distinct attribute values, the tags will always be unique within the VCN, and also the total number of tags will be much less than the actual number of individual documents. Further, the tag can be used by the content routers to infer about a content i.e., the routers do not have to be all knowing about the contents for making an optimal routing decision.

The content classification process of the invention includes two phases. In the first phase, the resource requirements for storage and processing are identified and the CECs are created. This process is usually performed when a content is first introduced in the VCN. It can also be repeated when the configuration of the VCN changes. During this phase, a portion of the tag is derived that is used to discover content. We call this portion of the tag as the primary tag. The remaining portion of the tag, called the secondary tag, is derived during the second phase of the classification process. The second phase identifies the values for the semantic attributes of content at the time a client submits a request to the VCN. The semantic attribute values are used to select an appropriate path from the client to the server. The secondary tags may also be used by the CERs/CSRs to partition the set of all possible requests for the same content into disjoint subsets. From a forwarding point of view, all requests within a subset will be treated in the same way by the content routers in the VCN.

The first phase of content classification process can be performed in two ways similar to the differentiated services: (a) behavior aggregate (BA) and (b) multifield (MF). In the BA, the content owner is cognizant of the content behavior (e.g., demand) of the content to specify how the content should be handled. Typically, the content owners would request the VCN to handle their content as a class by itself. The tag assignment, however, is performed by the VCN. For example, a suitable pricing scheme and service level agreements for the content management service that is beyond the scope of this document may be used to prevent a customer from denying services to other customers. In the MF, the content owner is not cognizant of the content behavior but wishes to use the VCN for faster content delivery. In this case, the VCN performs content classification using the scheme described below.

In the content-based routing scheme, during the first phase, the CERs use the structural attributes to describe a content's storage and processing resource requirements. These are (a) content size that indicates the storage space required at the surrogate servers, (b) the type of content e.g., streaming or non-streaming, audio/video or text, (c) popularity of the document containing the content (i.e., the number of times the document was requested with respect to other documents available in the VCN), and (d) the minimum network-based resources (e.g., bandwidth) and the time required to deliver a content (this is considered only in case of streaming contents). These attributes provide the most generic description about what is being transported across the network. Statistical analysis of the Internet traffic provides all the attribute information required for classification of content.

One may think about the first phase as a procedure of partitioning the set of all possible documents that the VCN can handle into a finite number of disjoint subsets, called CECs, where each subset holds a finite number of documents of similar type and having similar storage space requirements. Storage space requirement gives the measure of how much storage space should be allocated to contents with respect to their popularity within the routing domain. We group together all contents that require similar storage space and are of similar type. Each CEC is identified by a tag that is unique within the VCN. Client requests are marked by the tag which is used to identify the CEC (and in turn the hosting server) holding the content requested by the client. From the routing point of view, all client requests that have the same tag are handled in the same way by a CER or CSR as compared to other requests with different tags (e.g., requests with similar tags require similar resources).

Next, the process for creating the CECs is described. We assume that the VCN being an overlay network, will cover portions of several autonomous systems (AS) which make up the Internet. Our classification algorithm uses the popularity of the contents within each AS as a rank estimation factor to measure the amount of storage resources required by each document. This is done by constructing a document-AS matrix A where each row of the matrix corresponds to a document hosted by the VCN and each column corresponds to an AS which is part of the VCN. The matrix elements represent the relative storage space required for each document as per its popularity level within each AS, i.e., $$\text{matrix } A^{m \times n} = [a_{ij}]$$

where m denotes the number of documents hosted by the VCN and n denotes the number of AS(s) which are part of the VCN and $a_{ij}$ is the ratio and popularity of the document i in AS j such that $0 < i \leq m$ and $0 < j \leq n$. We call $a_{ij}$ as the relative weight for document i in AS j. In effect, the relative weight scale will determine the storage space requirements of each content relative to other contents in the VCN. In practice, local and global weights are applied to increase/decrease the popularity of documents within each AS. Specifically, $$a_{ij} = \frac{s_{i,t}/\bar{s}_t}{L(i, j) \times G(i)}$$

where $s_{i,t}$ is the size of the document i and which is of type t, $\bar{s}_t$ is the approximate size of all documents which are of same type t as the document i, L(i, j) is the local weight representing the popularity of the document i in AS j, and G(i) is the global weight representing the subscription level of the document i (more specifically, the subscription level of the content-provider hosting the document i) within the VCN. The value $\bar{s}_t$ is tuned by the VCN administrator while configuring the VCN at the setup time. This parameter is used mainly to differentiate between the different types of contents, like an HTML document or a movie document, such that sufficient storage space is allocated to a document in relation to other documents of the same type.

As mentioned earlier, all the CERs in the VCN create groups among themselves. The matrix A is computed and maintained by each group of CERs. Each server-side CER informs each of the CER groups about the new contents that are introduced to the VCN. The CER groups generate the matrix A, create the CECs and their corresponding tags. This method reduces the overall processing load for each of the CERs and distribute the load across the network. The namespace tree comprising the content-to-tag bindings are maintained by each of the CER groups. Moreover, at times of failure each CER group acts as a backup for other CER groups.

It should be noted that until now the relative weight ($a_{ij}$) values were calculated on a per document basis. This becomes a computationally intensive process for a very large number of documents. Instead, we first create groups of documents and calculate the relative weights for each group. The CECs are composed of these groups of documents. This reduces the size of the matrix A and also improves the processing efficiency. For example, we can create a group of documents using the URL prefix http://www.abc.com/sports. This URL prefix identifies a directory containing some number of documents. We consider all the documents in this directory as a single content entity during content classification. The sum of the sizes of each of the documents in the directory is the total size of the content entity and an average of the total popularity of all the documents in the directory for a particular AS represents the local weight for the content entity.

The invention introduces a pair of tunable parameters while creating the CECs: low ($l_b$) and high ($h_b$) bounds to limit the total amount storage space required for each CEC. The total storage space for a CEC is the sum of the storage spaces for each data objects in the CEC. Higher bound $h_b$ depicts the maximum amount of storage capacity that can be allocated to a CEC and lower bound $l_b$ depicts the minimum amount of storage resources that should be allocated for a CEC. The $l_b$ and $h_b$ values are chosen suitably by the VCN administrator at the time of VCN setup for proper functioning of the routing protocol. Surpassing $h_b$ may create a single CEC that contains all the documents hosted by the VCN. Instead, it is more efficient to create smaller content groups and distribute the groups across the VCN. This helps in (a) managing the available storage space at the surrogates more efficiently, (b) store the contents as per their popularity in different sections of the network, and (c) allow an even distribution of the client requests across the VCN. The replication algorithm, which is beyond the scope of this thesis, will use the CECs to create copies of the contents (i.e., all contents in a CEC are copied at the same surrogates). The number of copies for each CEC and their storage location will, however, be determined by the relative weight (i.e., $a_{ij}$) of the CEC.

In the second phase, the semantic attributes are used to identify the delivery requirements that are imposed at the time a client requests a content. The values of the semantic attributes are used to create the secondary tags. The primary and secondary tags are together used to tag a request packet. The semantic attibutes that are used in our scheme are (a) the QoS attribute and the (b) access attributes. The QoS attributes can be explicitly mentioned by a service level agreement like Diff-Serv. The intended usage of the requesting application are also included while creating the secondary tags. This is identified by the protocol number mentioned in the IP header of the request packets. When a client-side CER (ingress CER) receives a request packet, it will parse the packet to identify the content being requested and also identify any specific resource requirements that are explicitly mentioned in the packet. An examination of the TOS (type of service) field, also called DS (Diff-Serv)field, [14] reveals any per-hop behaviour (PHB) specified for the packet. In case no PHB is mentioned, the protocol field identifies the protocol being used by the requesting application. The ingress CER uses a pre-defined code to describe the protocol in the secondary tag. The invention uses a 8-bit long secondary tag to define a PHB or any other specific services being requested.

Content-based Tags

Temporary Tags

Most of the information that are used for content classification and tag generation are obtained from the statistical analysis of the VCN traffic. The traffic analysis process is handled distributively by the CER groups in the VCN. This analysis will generate a detailed report on the usage and characteristics of content attributes. This is, however, a time consuming process and is repeated infrequently. As a result, when a new content is introduced to the VCN, it may not be assigned a tag based on its attributes immediately. This is mainly because no information will be available for the new content from the last traffic analysis. To cope with this problem, temporary tags are introduced.

Each group of CER will maintain a pool of free tags (i.e., tags with no content bindings). When a new content is introduced to a CER, it chooses a free tag maintained by its group of CERs and creates a new content-name to tag binding using the free tag. The tag chosen from the pool of free tags to create a new content to tag binding is called the temporary tag. More specifically, the primary portion of the tag will contain the temporary tag and the secondary tag will be created when a request for the content is submitted to the VCN. This content name to temporary tag binding is pushed to all the CER groups in the VCN. All client requests for the new content will be routed based on the temporary tag assigned to the content. Once a temporary tag is assigned to a new content, the VCN will start collecting traffic information for the new content. During the next cycle of content classification process a content-based tag will be assigned to the content with a temporary tag. The content-based tag is derived from the content's new attribute values. The temporary tag is returned to the free pool of tags. FIG. 6 shows the sequence in which the temporary and the content-based tags are generated and managed. The forwarding algorithm will always give priority to all contents with content-based tags over the contents with temporary tags.

Tag Format

As mentioned earlier, the content tags are created based on the values of the CEC attributes and have a primary and a secondary portion. The primary portion is created during phase-I of the CEC creation process by the server-side CERs. The secondary portion of the tag is created during phase-II by the client-side CERs. The primary portion is used to locate the content while the secondary portion is used for accessing the content. In effect, a combination of the primary and the secondary tag portions will be used to select a suitable path from the client to an appropriate hosting site. A 32-bit tag is attached as a content header to encapsulate the IP packets before pushing the packets into the VCN. The encapsulation is somewhat similar to that used by MPLS. Those links which cannot include the content header in the link layer header (e.g. Ethernet), the content header is carried in a shim header between the link and network layers (layer 2 and layer 3 of the OSI model). For links like ATM and Frame Relay, the content header can be carried inside the layer 2 (i.e., the link layer). The format of the content header is shown FIG. 7.

The 24-bit primary tag is the content-based name that is used to identify a content. The primary tag comprises of a 2-bit type field, 2-bit content format (CF) field, 12-bit size field and a 8-bit priority field.

The type field is used to distinguish between the different types of content that is being delivered. The FIG. 16 shows the different values for the type field. Streaming content identifies all audio/video data objects and non-streaming content refers to all text or application data and multimedia objects like images. Temporary field identifies that the tag assigned to the content is temporary. In case of a temporary tag, the CF, size and priority fields are replaced by the temporary tag. This means that the temporary tag can be of maximum 22 bits. The reserved field indicates future usage.

The 2-bit CF field will identify the end data type of the content. FIG. 17 gives a probable list of different end data types as defined by [18]. The list shows an example of how end data types can be specified for different types of content. This list can be altered, by adding or removing any end data types, by the discretion of the VCN administrator.

The size field represents the size of the CEC in the VCN. It is obtained by mapping the CECs onto divisions representing different sizes. Each division represents a range of document sizes in bytes and is identified by a 12-bit number i.e., we define $2^{12}$ or 4096 divisions and each division defines a range of bytes. The CECs are mapped to one of the divisions based on the CEC size which is the average size of all the documents in the CEC.

The priority field represents the popularity of a CEC in the VCN. The CEC popularity is given by the average popularity of all the documents in the CEC. Similar to the size field, the priority field is also represented by a set of divisions ($2^8$ or 64 divisions) with each division identifying a range of values.

The secondary tag consists of the 8-bit CoS (class of service) field. This will indicate the intended usage of the content or the service level agreement policies e.g., Diff-Serv. The intended usage is identified by the protocol number of the requesting application. A pre-defined list managed by the VCN administrator will provide a CoS field value for the different protocol numbers. The Diff-Serv class of services mentions the differentiated services that is to be provided to the client request. The CoS value identifying intended usage is always greater than the 6-bit codepoint value (codepoint identifies the standardized per hop behaviors in Diff-Serv).

As mentioned earlier, all the CERs will create groups among themselves to hold the entire namespace for all the documents hosted by the VCN. We represent the namespace in form of a tree. FIG. 8 shows such a tree. The leaves of the tree hold the primary portions of the content-derived tags and the higher levels of the tree holds some part of the URLs to identify the documents. A client-side CER, upon receiving a request will parse the request to identify the document requested. It will then walk down the namespace tree to identify the tag assigned to the document. Once, the primary tag is identified the CER will generate the secondary tag for the request. Once the whole tag is generated the routing process is initiated.

MODES OF OPERATION

The invention describes various operating modes for PICS. Before presenting the different modes, the fundamental differences between the existing routing approaches and PICS approach are examined.

A content accessing scheme should optimally implement the following two major functions to ensure efficient usage of the resources and to enhance the content delivery performance to the client.

Server selection: selects the site and the server within the site that serves the requested content.

Path selection: selects the path along which the selected server delivers the content to the clients.

Most of the existing content accessing approaches proceed in two phases: (a) resolution of a location-based name to obtain an IP address that specifies the destination host and (b) access the content from the destination host using the IP address. This process is illustrated in figure FIG. 9(*a*). In the current Internet, the server selection is exclusively handled by the name resolution phase. The path selection is performed in the second phase and is determined by the traditional Internet routing protocols such as Open Shortest Path First (OSPF) [12] and Routing Information Protocol (RIP) [10]. In case QoS constraints should be met by the selected path, we can use Resource Reservation Setup Protocol (RSVP) [22] or Differentiated Services (Diff-Serv) [20].

Recently, several content-based name resolution schemes have been proposed. These schemes differ from traditional name resolvers such as Domain Name Server (DNS) [19] in that they use a highly distributed "flat" resolver network. The request for resolution is routed through the flat resolver network using the content that is being requested. One of the advantages of this approach is that the name resolution may take into consideration fast varying parameters such as server load. The dissemination of such parameters may be localized to the nearby name resolvers.

Another alternative is to unify the server and path selection processes. The PICS scheme proposed here splits the name resolution into two phases. In the first phase, a content-based identifier (typically a location-based name but can be any other set of content attributes) is resolved to a fixed format tag. In the second phase, the tag is further resolved using a highly distributed "flat" routing network to reach the eventual server for the content. Depending on which mode of PICS operation is selected, the path for delivering the content back to the client is also selected by this process. This process is illustrated in FIG. 9(b).

Below two different modes of PICS operations are described. The first mode is referred to as the Route Push Method (RPM). In this method, the content-based routes are pushed from the server-side CERs, which are the eventual destinations of any request, towards the client-side CERs. The second mode is referred to as the Route Push and Pull Method (RPPM). In this method, the content-based routes are disseminated by a combination of push and pull-based schemes. In both the methods, we assume that the reverse flow that carries the data from the server to the client follows the same path that was traversed by the request.

Route Push Method

As mentioned previously, the VCN consists of CERs at its edge and CSRs at its core. The VCN can be considered as a highly distributed content router where the request for content enters the VCN via a client-side CER and is routed by the CSR network towards a server-side CER that can lead to the server with "best" performance. The server-side CER then delivers the request to the best server.

In this method, the server-side CERs receive advertisements from the hosting servers that are connected to them. The advertisements may contain some characterization of the content hosted at the servers (typically a content name) and utilization of the servers. The server-side CERs use a "tagging function" (content classifier) that takes the advertisements as arguments to derive content-based tags.

The tagging function may be implemented at the server-side CER as a tree-walking process that uses a namespace tree to bind a content-name to a tag. The binding process may use information from the content characterization schemes as explained in the next section. Once a server-side CER binds a content-name to a tag, two processes should take place: (a) dissemination of the tag and the corresponding content "serving" performance at the CER into the VCN, and (b) dissemination of the tag and content-name bindings to other CERs so that they could reuse the tags.

The tags formed by the server-side CERs are used to form a content-based route entry containing the (a) content tag and (b) effective server utilization index at the CSRs within the VCN.

The tag dissemination is done in a "feed-forward" manner along a tree like structure with a server side CER initiating the distribution and acting as the root of the tree, the CSRs form the intermediate layers of the tree and the client side CERs form the leaves of the tree. Multiple Tag Distribution Trees (TDTs) may be formed in this way and may have common CSRs at different levels for the different trees. The advantage of such a scheme is that almost all the information available at the input layer, comprising of different server side CERs, will be available at the output layer, comprising client side CERs, and also provide multiple paths for each tag disseminated through the VCN. Routing table at each content router holds the content tags, the next hops for the tags and a route factor. Since there can be multiple paths for each tag, the route factor reflects the condition of each path.

FIG. 10 shows two TDTs with CER-A as the root of $TDT_1$ and CER-B as the root of $TDT_2$. CSR-1 is at the first level with respect to $TDT_1$ and at the second level with respect to $TDT_2$. CER-1 and CER-2 form the leaf nodes of the two TDTs. Loop prevention algorithms are used to detect and prevent any loops among the content routers due to the tag-based routing. When a client request arrives at a client side CER (CER-A), a content tag that is derived from the content name is bound to the request. The CER-A examines its content-based routing table to obtain a possible next hop. A "route factor" associated with the next hops is used to select the best performing next hop. Once a request is pushed into the VCN, it is routed towards the destination (server-side CER) by the CSRs using the content tag, i.e., the content name or any other information is not examined by the CSRs.

The server side CER forwards the request towards the best performing hosting server. Due to route propagation delays, the request routing will be based on progressively accurate information, i.e., as the request nears the destination it will be routed using more current information.

The data from the server is delivered to the client along the path that was traversed by the request. The route factors that were used to choose the next hops when the request was steered through the VCN are dependent on the network status and capacity as well. By computing the route factors appropriately, it may be possible to give probabilistic network QoS to the requests. FIG. 11 illustrates the request steering and data forwarding in an example VCN. The client request initiates from CER-1 and flows through the VCN to the CER-A. The return path is the same as the forward path and it is used to deliver the content to the client.

The CERs may be grouped together such that a group maintains a single namespace tree. In each group, a CER holds a portion of the tree and maintains a pointer to the CER in the group that maintains the remaining portion of the tree. It should be noted that the group of CERs maintain a single namespace tree. Therefore, when a request reaches a CER it uses the appropriate CER within the group to resolve the content name to the tag and then injects the tagged request into the VCN.

Route Push and Pull Method

In the RPM, once a content-name to tag binding is created, it is pushed to all CER groups. Therefore, a group of CERs is supposed to know about a content-name to tag binding if the content with the given content-name is managed by the VCN. This approach may not be scalable unless the VCN is restricted to manage a reasonably small number of different contents. In this case it may be best to choose the most popular set of content to be managed by the VCN.

The RPPM, on the other hand, provides a flexible scheme that enables the VCN to handle much larger numbers of content-name to tag bindings. In this method, the CER groups are organized into a virtual hierarchy as shown in FIG. 12. The leaves of the hierarchy have physical CERs and the interior nodes of the hierarchy have virtual CERs (VC-ERs). A VCER may be implemented using one physical CER or a group of physical CERs.

The CERs examine the content requests that pass through them. With a virtual hierarchy such as the one presented above, it is possible to perform different types of traffic analysis. This analysis could be used to determine several traffic characteristics including (a) surges in demand, (b) relative demand of the different content, and (c) security violations and intrusions.

With the statistical information obtained through traffic analysis, we can determine the relative popularity of the various content handled by the VCN. This information is used to map the content-name to tag binding information onto the virtual hierarchy. The idea is to map the content-name to tag bindings for the highly popular content onto the physical CERs. More precisely, each group of inter-operating CERs should know about all the content in the "popular" set. Therefore, for a content in the popular set, there will be a maximum of one "miss" while resolving the content-name to a tag. The miss could happen at the ingress CER. In case of a miss at the ingress CER, a "hit" is certain, for popular content, at the next CER pointed by the namespace tree at the ingress CER. We refer to this timely processing of popular content as "fast mode" processing.

The less popular content are mapped onto the VCERs such that the least popular ones are mapped only at the root of the hierarchy. When a request for a less popular content (managed by a VCER) arrives at a CER, it will miss at the ingress CER and at the group level. The virtual hierarchy will be traversed to find the content-name to tag binding for this content. The resolution time increases as the content-name to tag binding information is held further up in the VCER tree. This is referred to as the "slow mode" processing. As the popularity of a content increases, the RPPM "pulls" the content-name to tag binding information down the hierarchy, thus decreasing the resolution time for subsequent accesses for the particular content.

The pulling of the content-name to tag binding information down the VCER tree creates only temporary copies of the binding information. When the surge in popularity subsides, the copies are deleted. Therefore, pulling the binding information down the hierarchy effectively moves the content processing from slow to fast mode. As the popularity for a document decreases, the content processing returns to the slow mode.

Initially, a content to temporary tag binding will be maintained at the lowest level of the VCER tree. Once the VCER tree starts receiving traffic analysis reports about the demand for the contents with temporary tags, the temporary tags will be pushed up or pulled down according to the demand across the different hierarchies on the VCER tree.

PICS Forwarding Algorithm

The forwarding algorithm used by the routing components of the VCN is based on the content-based tag and the routing fractions generated by the VCN. A routing fraction (RF) refers to the load status of a path between any two routing components (e.g., CSR and CER). A content hosting server site (S) will frequently update it's neighbor CER(s) with a RF that indicates the server's most current load status.

The receiving CER will include the load status of the CSP, along which it received the status update, to the RF value received from the server site. The CER will then distribute the updated RF value to its neighbor CSR(s) and CER(s). This way, the RF value received at a client-side CER will indicate the condition of an entire path (i.e., sequence of CSPs) from the server S to itself. Each of the content hosting sites in the VCN will generate such a status update packet. Each of the CSR/CER(s) will maintain an RF table to store the RF values received from all its neighbors. The RF table will be updated very frequently. FIG. 13 illustrates the PICS forwarding process.

Each CSR and CER (specifically CER groups) will also maintain a routing table, where each entry contains a tag component and a probable next hop for the tag. The next hop will be a neighbor CER or a CSR, or a content hosting server. The forwarding algorithm which uses the RF values for the neighbors to make routing decision works as follows. When an ingress CER receives a request packet, it will encapsulate the request packet with an appropriate tag obtained from a VCER tree. The ingress CER will use its routing table to find the possible next hops for the tag used to encapsulate the request packet. It will choose the next hop with the best RF value and forward the encapsulated packet to that next hop. A CSR on receiving an encapsulated packet will extract the tag from the encapsulated packet and use it as an index to select the possible next hops from the routing table. Again, next hop with the best RF value is chosen and the CSR will forward the encapsulated packet to the next hop. An egress CER will receive an encapsulated packet, extract the tag and find the best next hop from the routing tables. If the next hop selected is a content hosting site, the encapsulation (i.e., the tag) is stripped off and the original packet is forwarded to the server. If the next hop is a CER or CSR, the encapsulated packet is forwarded to the next hop. A combination of the primary tag and secondary tag will identify the resource requirements of the requested content. The RF value from the RF table at a router will identify whether enough resources are available for delivery of the content along a CSP.

The invention claimed is:

1. A method for directing packets of data based on their content in a telecommunications network,
   wherein the physical network comprises a plurality of clients, a plurality of servers for supplying content and a plurality of content aware routers for directing communications over the network and wherein content represents the payload carried in the packets;
   the method comprising:
   providing a content intelligent overlay network that is a Virtual Content Network (VCN) created on top of the physical network;
   using the overlay network and a digest of the content to select a preferred path for the packets and the physical network layer is used to transfer the packets from one end to other end of the path:
   arranging the Virtual Content Network (VCN) to act as a distributed virtual content router and so as to be transparent to the users;
   forming the VCN by content edge routers (CERs) placed at the edge and the content switching routers (CSRs) in the core of the VCN;
   arranging the VCN to be sparser than the underlying physical network;
   connecting the CERs and CSRs using logical content switching paths (CSPs);

grouping together all contents hosted by the VCN with similar characteristics to create sets referred to as Content-Equivalence Class (CEC) in which the CECs allow handling of large volumes of data by creating content aggregates;

wherein the method further comprises the steps:

(a) identifying and describing content attributes where the attributes are classified as structural and semantical attributes of the contents and the attributes are used to characterize and classify the contents hosted by the VCN and create the CECs for these contents and where all CECs are unique within the VCN i.e. each CEC will have a unique set of attribute values;

(b) implementing a tagging function to create a fixed sized content-derived tag that is used to identify each CEC where the tag is derived based on the attribute values of each CEC and each tag is unique within the VCN and is used to route packets within the VCN; and (c) disseminating the tags within the VCN either at periodic intervals or on-demand.

2. The method according to claim 1 further comprising arranging each content-derived tag to actually correspond to a finger-print for the content that is requested by the packet and to represent a single or a set of servers that hosts the content; so that the destination of a packet (or a flow) is chosen from this set of servers during routing.

3. The method according to claim 1 further comprising encapsulating request packets using the content derived tags by attaching the content derived tag as a content header to the request packets, where the encapsulated packets are then pushed into the VCN and the tag in the content header is used to route the packets.

4. The method according to claim 3 further comprising using the content header to encapsulate the data packets so as to include the content storage and resource requirements in the content-derived tags in a digest form and this information is used by the CERs and CSRs to make routing decisions.

5. The method according to claim 1 further comprising replacing the normal IP routing table with a content-derived tag routing table at the content routers within the VCN where each content router within the VCN maintains routing tables to hold the content derived tags for content being hosted by the VCN.

6. The method according to claim 5 further comprising calculating routing fractions from a load condition of the hosting servers and a condition of a path leading to the servers from any point in the VCN where the tag routing tables contain the tags and the routing fractions, where the tags are used to select a set of servers and the routing fraction is used to find a best path to a best server and where a routing algorithm uses the tags to identify the requests and route the packets towards a 'best' destination.

7. The method according to claim 1 further comprising classifying contents using attributes which allow access to portions of a content hosting site at variable granularities so that it is possible to partition/replicate content hosting sites using different attribute values of the content hosted by the sites and no longer requires domain or locational information of the site for partitioning or replication.

8. The method according to claim 1 further comprising tagging request packets using content derived tags so as to eliminate the round-trip time involved for resolving (i.e., mapping) a request on to a specific server and so that the latency for content discovery is reduced.

9. The method according to claim 1 further comprising using, for the routing decision by the CSRs within the VCN core, the content-derived tags so as to eliminate the time required to parse the request packet repeatedly at each CSR along the routing path to make a routing decision.

10. The method according claim 1 further comprising creating the CECs and the content-derived tags by the CERs prior to the routing process by the steps;

(a) content characterization wherein identification of the structural and sematical attributes of content;

(b) content classification wherein the content attributes are used to classify content and create the CECs for each autonomous system (AS) in the Internet.

11. The method according to claim 1 further comprising providing a routing algorithm that uses the content-derived tags to route packets; wherein the algorithm comprises:

(a) a route push method wherein the content-based routes i.e., the tags are pushed from the server side CERs to all the client-side CERs wherein all CERs and CSRs know about all the tags maintained by the VCN;

(b) a route push and pull method wherein the content-based routes are disseminated and maintained in a distributive manner in the VCN by using a virtual content edge router (VCER).

12. The method according to claim 1 further comprising maintaining the tags within the VCN in a distributive manner by using the content edge router VCER, where (a) the virtual content edge router consists of physical CERs placed in a tree-like fashion;

(b) the lowest level of CERs of the VCER tree maintain tags for the most popular contents, the topmost level maintain tags for the least popular contents while the intermediate VCER levels handle contents of intermediate popularity.

13. The method according to claim 1 further comprising changing the popularity of the contents dynamically by:

(a) the VCER tree is used to define a fast and slow mode of routing;

(b) in the fast mode tags for all most popular contents are stored at the lowest level of the tree and in the slow mode, all less popular contents are stored in the higher levels of the tree;

(c) the tags are pulled down or pushed up the tree as the popularity of the contents change.

14. The method according to claim 1 further comprising facilitating the selection of the route by:

(a) obtaining information about the contents hosted by sites who wish to use the VCN for content delivery (i.e., content providers subscribe to the VCN);

(b) performing analysis of the Internet traffic for these contents;

(c) maintaining the content and corresponding tag information at the edge of the VCN.

* * * * *